Figure 1:
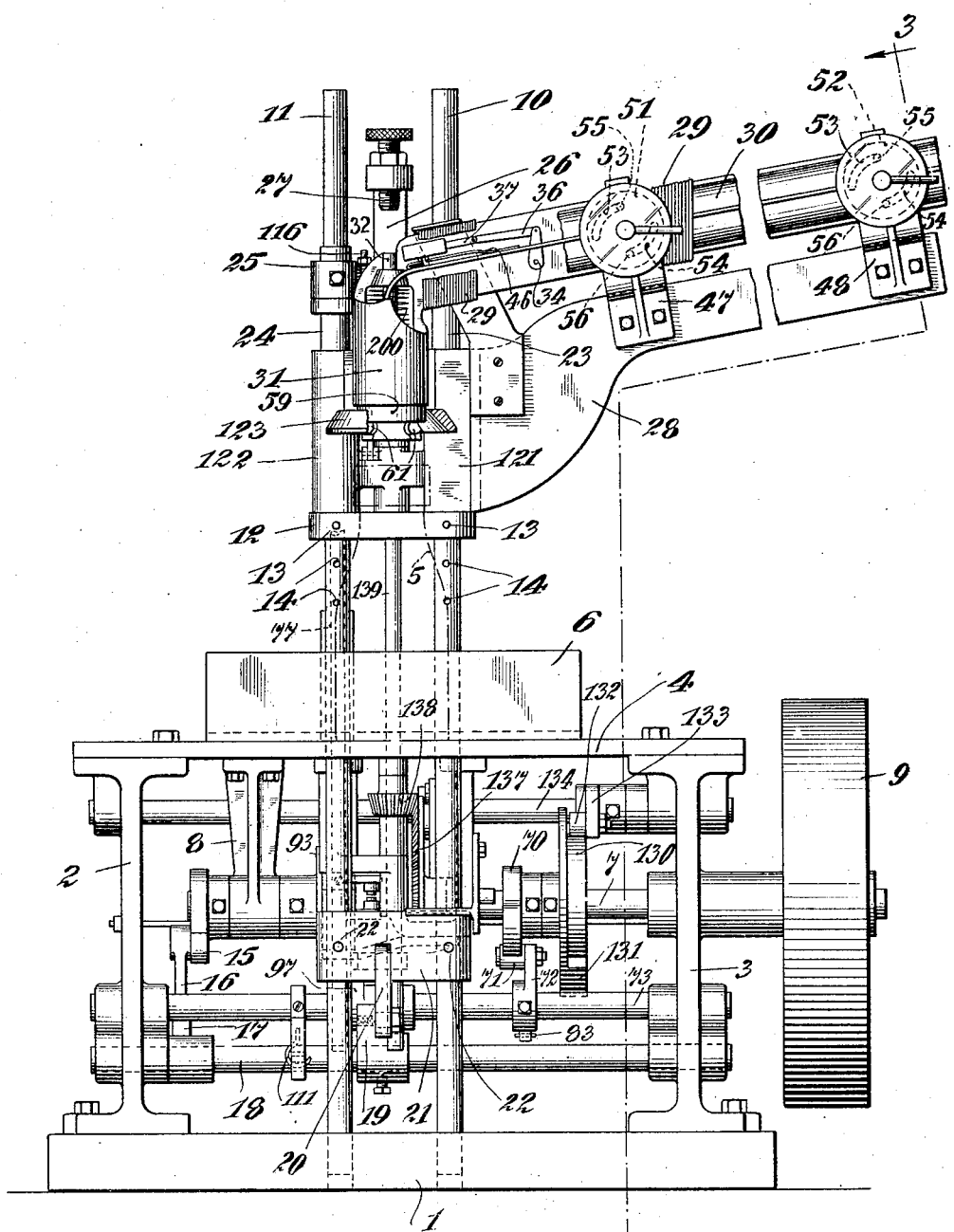

March 10, 1931. H. B. FOULDER 1,795,486
APPARATUS FOR SEALING ARTICLES WITH WIRE
Filed March 18, 1926 8 Sheets-Sheet 3

INVENTOR
Henry B. Foulder
BY
ATTORNEY

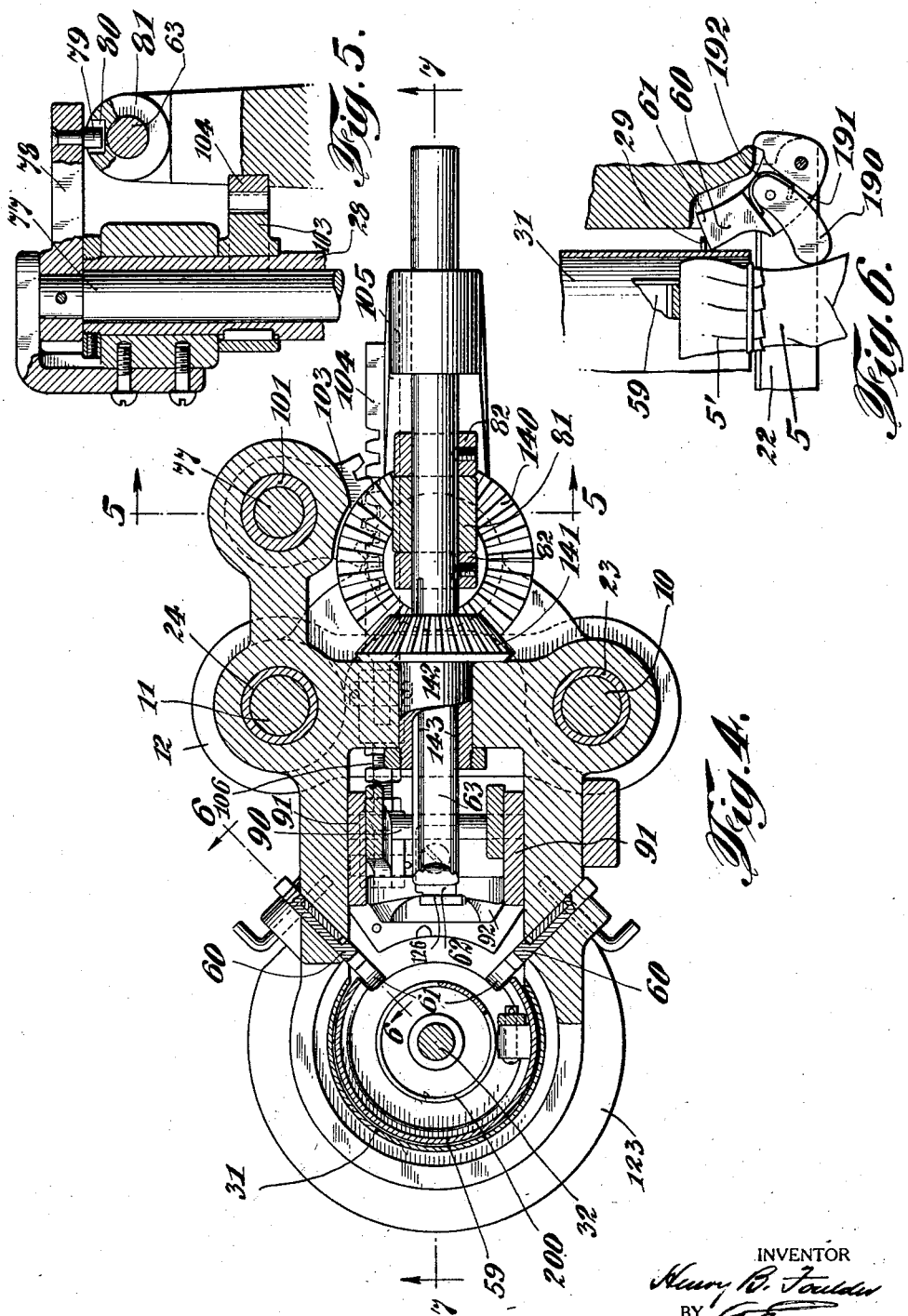

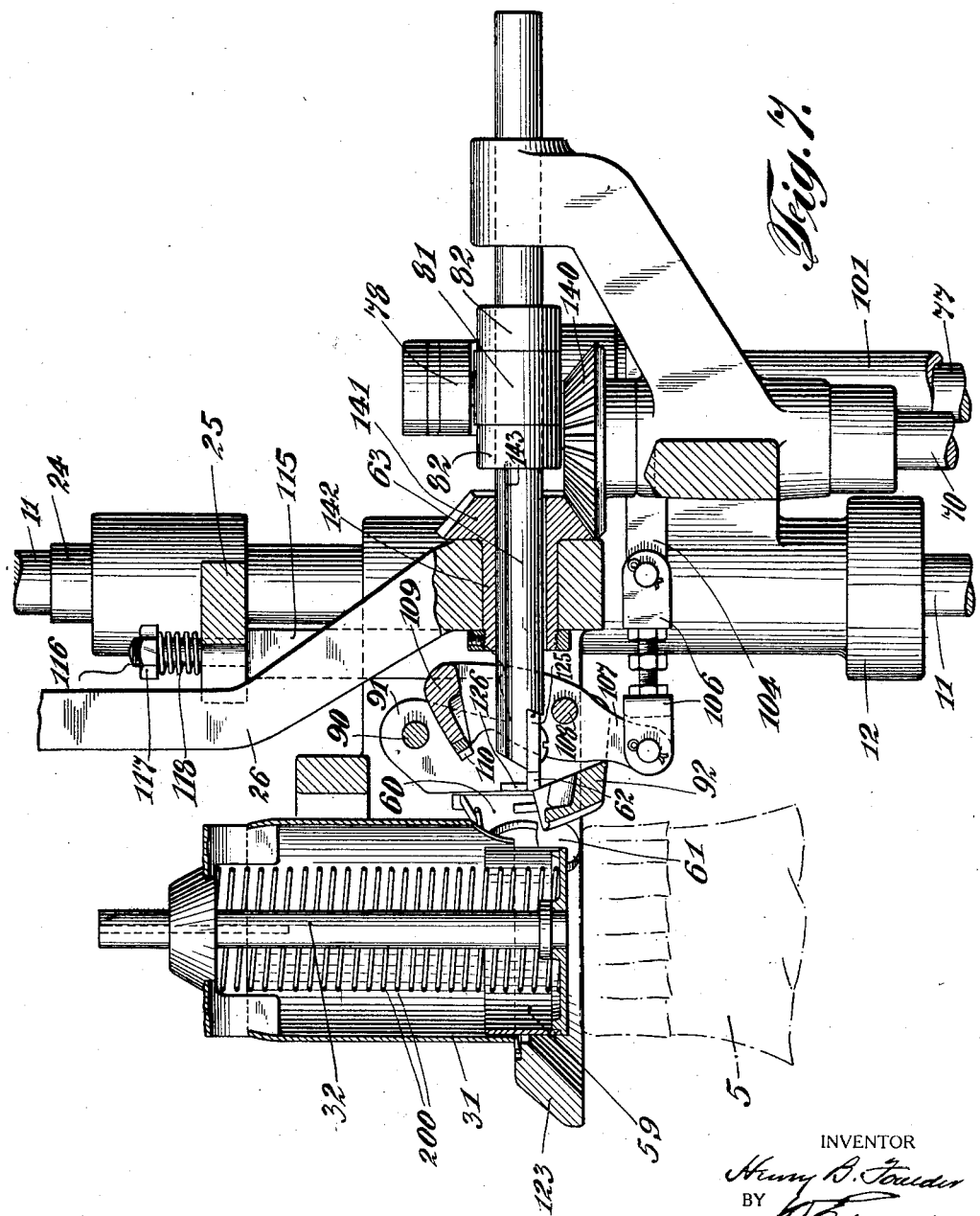

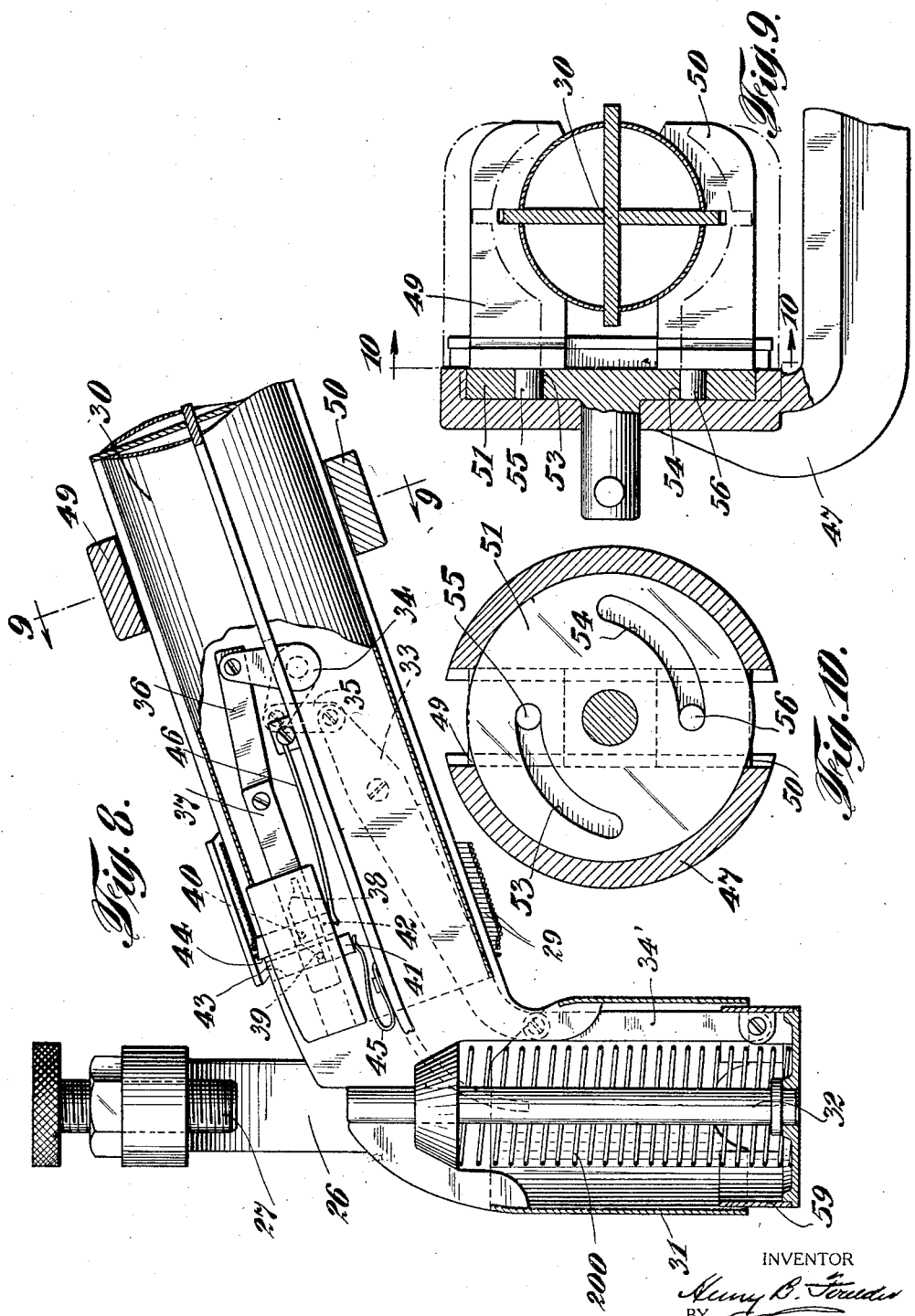

March 10, 1931.  H. B. FOULDER  1,795,486
APPARATUS FOR SEALING ARTICLES WITH WIRE
Filed March 18, 1926    8 Sheets-Sheet 7

INVENTOR
Henry B. Foulder
BY
Edwards
ATTORNEY

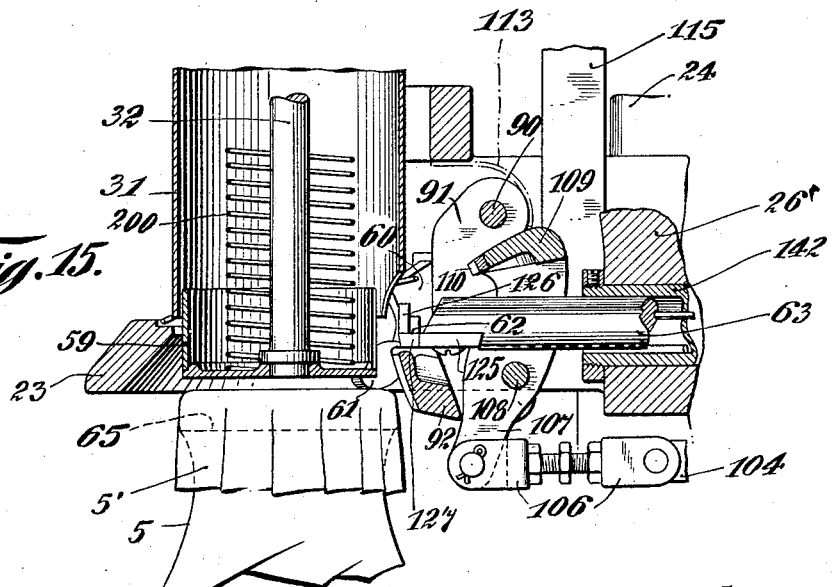
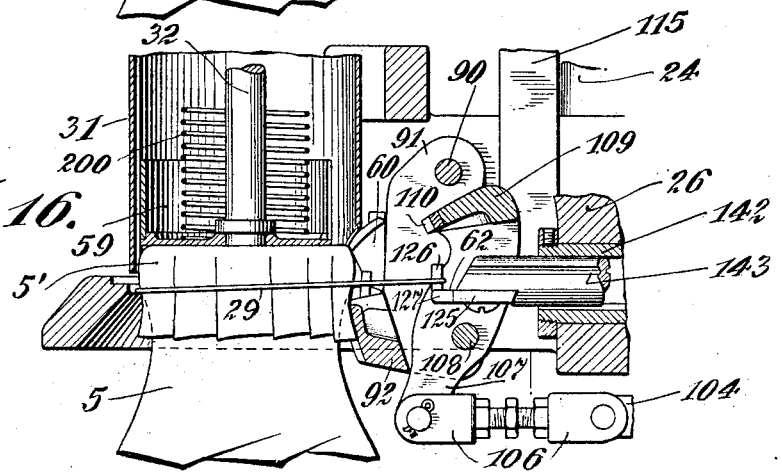
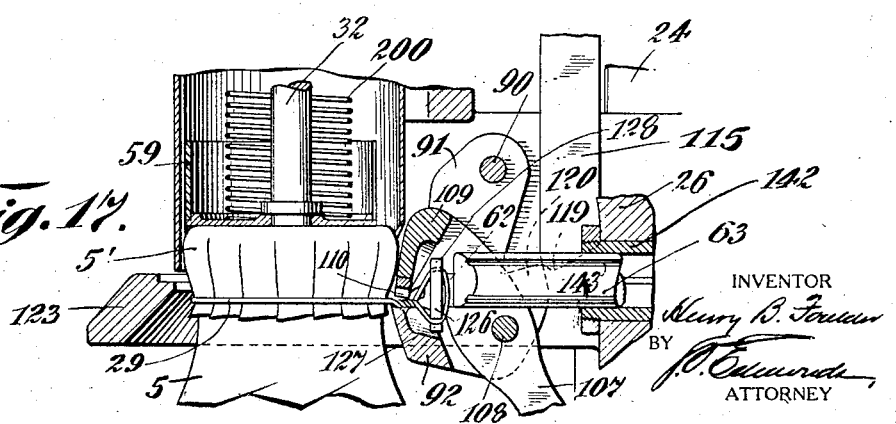

Patented Mar. 10, 1931

1,795,486

UNITED STATES PATENT OFFICE

HENRY B. FOULDER, OF GLENBROOK, CONNECTICUT, ASSIGNOR OF ONE-HALF TO JOHN P. CURRY, OF RIVERSIDE, CONNECTICUT

APPARATUS FOR SEALING ARTICLES WITH WIRE

Application filed March 18, 1926. Serial No. 95,584.

This invention relates to machines for sealing containers, and more particularly relates to machines for sealing closures over the mouths of bottles, or similar articles.

The machine which is chosen for description and illustration herein, to show one possible embodiment of the invention, is a machine adapted to seal hooks on milk bolttles, the invention being particularly well suited to this use.

It is customary to apply hoods over the mouths of milk bottles containing the choicer grades of milk, and to secure these hoods in place by means of metal rings. In practice, a hood is first placed on a bottle and then one of the rings is properly positioned about the skirts of the hood and below a lip at the mouth of the bottle, and the ring is pinched up at several places to reduce its diameter, to confine the ring beneath the lip and to bind the hood in place on the bottle. An objectionable feature is that these rings may be forced downwardly on the bottles to free the hoods for removal, so that the contents of the bottles may be tampered with. Although it is desired that after the hood has been once released the seals cannot be restored to original position sealing a hood in place, this is not the case, and it is comparatively easy to manipulate a displaced seal and a removed hood back into original positions. Thus, this type of sealing is ineffective to prevent an unauthorized person from making a substitution or adulteration of the original contents of the bottle without the fact being disclosed by the appearance or position of the replaced hood or seal. Moreover, before an emptied bottle is refilled and resealed, it is necessary that the former seal be removed, and this is a time consuming operation which is done by the bottler. The removal is done manually and results in a high percent of breakage, as well as involving expense.

One of the principal objects of this invention is to provide a machine for sealing hoods on bottles in a manner which prevents the contents of the bottle from being tampered with, without the seal being destroyed beyond restoration, so that if the bottle has been tampered with, the absence of the seal or its abnormal condition will indicate that fact. A further object of this invention is to provide a machine for applying a wire seal to bottles in such a way that there is established an effective seal which may be broken quickly and easily to permit access to the contents of the bottle, and at the same time causes the wire to be separated from the blottle, thus eliminating the necessity of a separate operation to remove the wire. A further object of this invention is to provide a machine of the character described which is simple, quick, and automatic in operation, requiring merely the feeding to the machine of ties and the proper placement of bottles provided with unsecured hoods, and the driving of the machine. A further object of this invention is to provide a machine of the character described which automatically feeds a tie through the machine when a bottle is in place to be sealed, and does not feed a tie in the absence of a bottle in proper position for receiving the tie, although the machine is driven continuously. The objects of this invention also include the provision of a magazine for ties; tie-feeding means; tie placement means; tie tensioning means; tie twisting means; tie nicking means; tie releasing means; and means synchronizing all of said means and correlating the movements of the various mechanisms and parts; and a further object of this invention is to combine all of these means into a compact, sturdy, and durable machine.

Briefly stated, the objects of this invention include the provision of a machine for tying objects with wire in such a way that a tied object is effectively sealed and cannot be unsealed without rupturing the wire tie, but can be unsealed readily and easily accompanied by the removal of the tie from the article, and the prevention of the reuse of the tie for unauthorized purposes; and the provision of an automatic machine for applying ties successively to successive objects.

Other objects of this invention will be in part obvious and in part pointed out hereinafter.

The invention accordingly consists in the features of construction, combinations of elements and arrangements of parts which will be described more fully hereinafter and the scope of the application of which will be indicated in the claims that follow.

In accordance with my invention, the machine includes, optionally, a magazine adapted to receive a plurality of wire ties in the form of endless rings; mechanism, coacting with an object in proper position to be sealed, to cause a tie to be delivered from the magazine and to be properly placed on the object, but which does not cause the delivery of a tie unless an object is in proper position to coact with this mechanism. There is a twisting spindle having a hook on which a delivered tie is automatically engaged, as it is engaged with the object, and means for retracting the spindle to tension the tie, while other means coact with the object to prevent the object from following this pull. Then the machine operates to rotate the spindle to twist the tie upon the object while advancing the spindle to follow the shortening of the tie due to the twisting. The machine then places a nick in the tie near its twist, so that any attempt to loosen the tie by untwisting it will result in the breaking of the tie and its divorce from the object. The spindle hook then releases itself from the tie by rotating in reverse direction, and all parts of the mechanism are drawn away from the sealed object to permit unobstructed removal thereof and to permit proper and unobstructed placement of the next object to be sealed.

It is contemplated that the machine will be used in association with automatic means for successively feeding to the machine objects to be sealed thereby and for removing each object when sealed.

Figure 2:
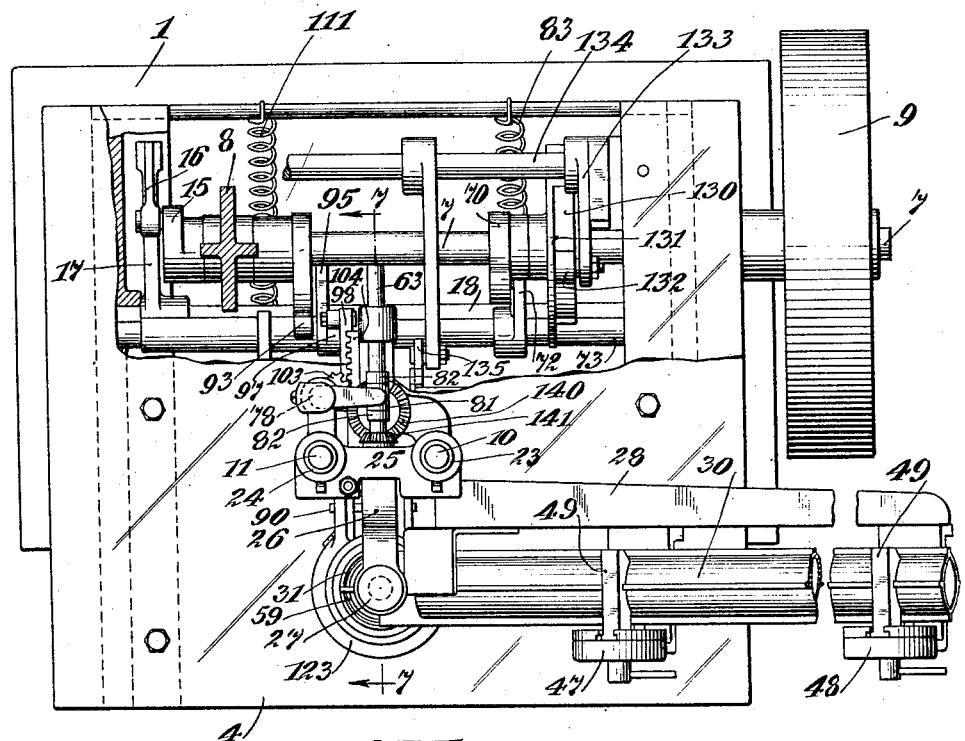
Figure 3:
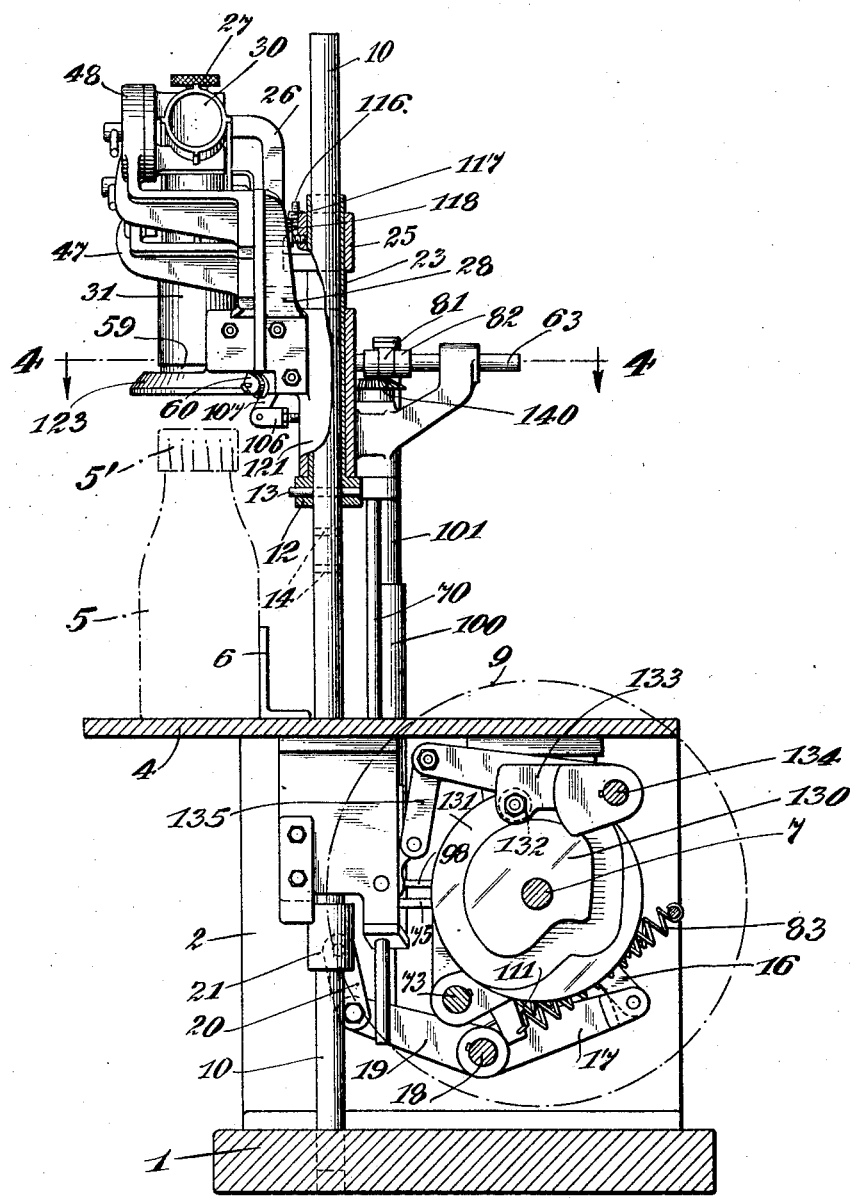
Figures 11, 12:
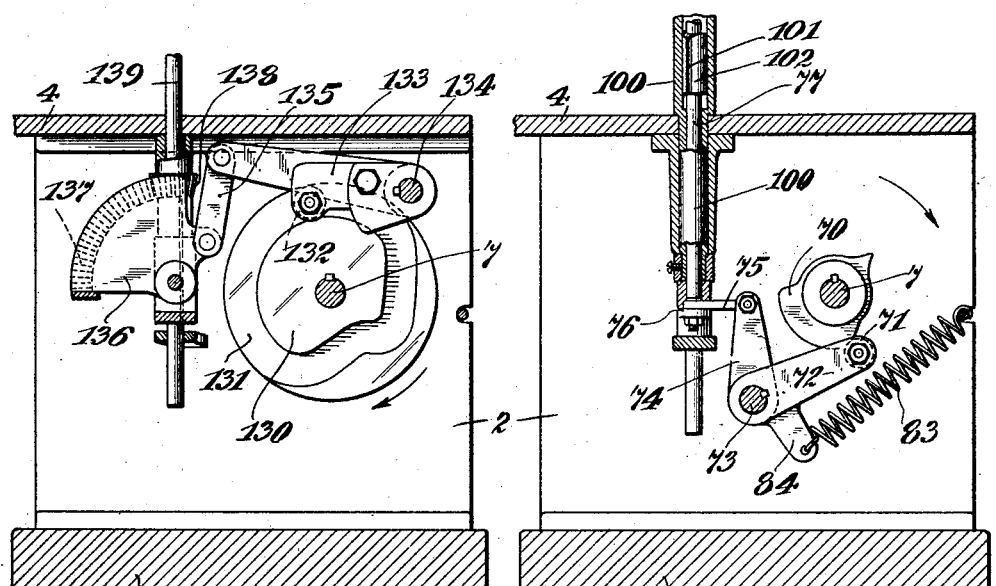
Figures 13, 14:
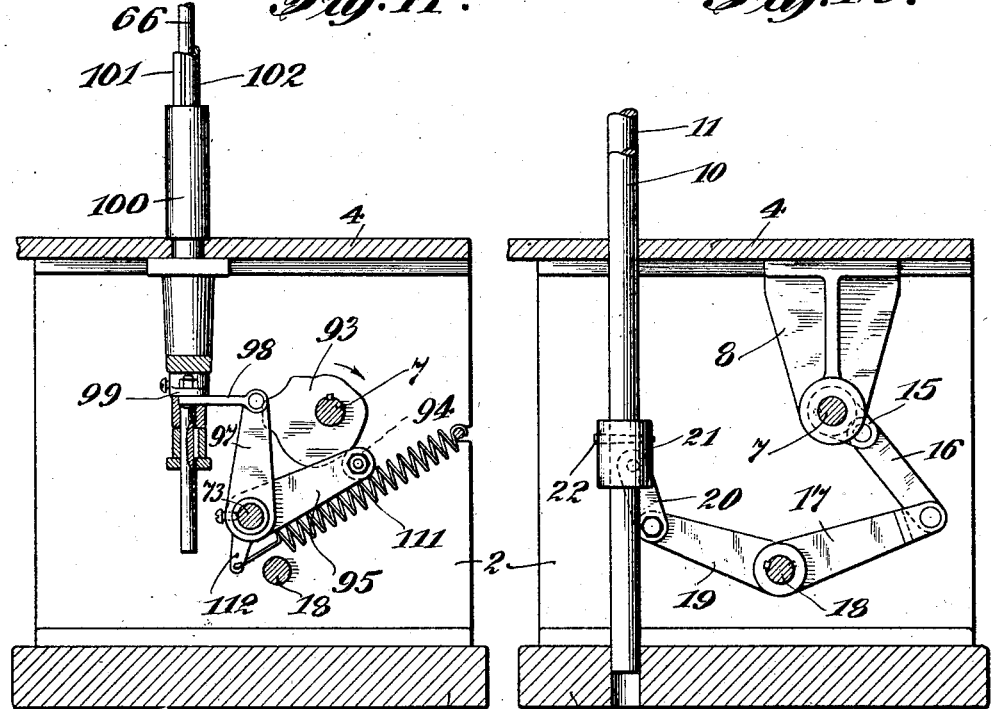

In order that a clearer understanding of my invention may be had, attention is hereby directed to the accompanying drawings, forming a part of this application and illustrating certain possible embodiments of this invention. Referring to the drawings, Fig. 1 is a front elevation of a machine embodying my invention, and particularly well suited for sealing hoods over the mouths of milk bottles; Fig. 2 is a plan view of the machine partly broken away; Fig. 3 is a sectional view of the machine, and is taken on the line 3—3 of Fig. 1; Fig. 4 is an enlarged sectional view of the machine, and is taken on the line 4—4 of Fig. 3; Figs. 5 and 6 are sectional views of details of the machine, and are taken, respectively, on the lines 5—5 and 6—6 of Fig. 4; Fig. 7 is a sectional view of a fragment of the machine, and is taken on the line 7—7 of Figs. 2 and 4; this shows the parts in released position assumed before and after each sealing operation; Fig. 8 is an enlarged sectional view of the ring tie magazine and the tie feeding and delivery mechanism; Fig. 9 is a sectional view of the same, and is taken on the line 9—9 of Fig. 8; Fig. 10 is a sectional view thereof, and is taken on the line 10—10 of Fig. 9; Fig. 11 is a sectional view showing the actuating parts of the tie twisting mechanism; Fig. 12 is a sectional view showing some of the actuating parts of the mechanism for reciprocating the tie twisting spindle; Fig. 13 is a sectional view showing some of the mechanism for reciprocating the anvil and the tie nicking device; Fig. 14 is a sectional view showing some of the mechanism for reciprocating vertically the rods which support the yoke which carries the head casting; Fig. 15 is a large sectional detail of certain parts of the machine showing the first step in applying a wire ring seal to an article; Fig. 16 is a similar view showing the tie applied and under tension and ready to be twisted; Fig. 17 is a similar view showing the tie twisted and being nicked, the head of the twisting spindle being still engaged with the tie and about to release itself therefrom; Fig. 18 is an enlarged front view of the head of the twisting spindle; Fig. 19 is a plan view of the same; and Fig. 20 is a side view of the same.

Similar reference characters refer to similar parts throughout the several views of the drawings.

The machine illustrated in the drawings has a suitable frame or table, including a base plate 1, side plates 2 and 3, and a top plate 4, which supports milk bottles 5, or other objects or articles, when placed against a locating plate 6 thereon, in proper position for sealing by the machine.

The main drive shaft 7, of the machine, is journaled in plate 3 and in a bracket 8 suspended from plate 4, and is driven continuously through its pulley 9, or any other suitable means, from a suitable source of power, not shown.

A pair of vertical rods 10 and 11 are slidably journaled in plates 1 and 4, and carry a yoke 12, which is pinned to one or both of these rods, as by pins 13, which seat in perforations in the yoke and are engageable selectively in the holes 14 in rods 10 and 11, so that the yoke may be adjusted on these rods into different elevations above the table 4 to adapt the mechanism carried by the yoke to seal objects of different heights.

During the operation of the machine, the yoke is lowered and raised periodically by drive shaft 7, which, for this purpose (see Fig. 14), has a crank arm 15 connected by link 16 to an arm 17 of a rock shaft 18, on which is secured another arm 19, which is connected by a link 20 to a yoke 21 fastened to the shafts 10 and 11, as by pins 22. Thus, for every revolution of shaft 7, the upper yoke 12 makes a full stroke up and down. When at the top of the stroke, the yoke 12 is more than the height of a bottle above table 4, to permit unobstructed placement or removal of a bottle beneath the yoke. At its lowest point, yoke 12 is somewhat lower than the top of the bottle.

Normally resting on yoke 12, and slidably encircling rods 10 and 11, are legs 121 and 122 of a casting which has also a horizontal circular portion 123 joining the legs 121 and 122. Each rod has a bushing 23, 24, which extends higher than the parts 121 and 122, and has secured thereto one end of a yoke 25 provided with a bracket 26 carrying a set screw 27. This casting also carries an arm 28 which supports a magazine for ties 29. Each tie may be an endless wire ring.

The magazine has an inclined arm 30, on which a large number of ties may be placed, and a vertical tubular portion 31 which properly directs each tie upon a bottle to be sealed. A plunger 32 (see Figs. 15 and 16) is movable in the tube 31 to actuate mechanism for releasing a tie from the magazine arm 30 each time the plunger makes a full stroke up and down. To this end (see Fig. 8), a system of levers 33, 34 and links 34', 35 and 36 connect a head 59 on plunger 32 to a sliding bar 37, which has a cam slot 38 in which engages pins 39 and 40 of a pair of slidable plates 41 and 42, which have fingers 43 and 44 movable into and out of the path of movement of the ties along the magazine arm 30. Each plate 41 and 42 is pressed outwardly by a spring 45, 46.

The magazine 30 is removable from the machine, being securable thereto by clamps 47, 48, which are mounted on bracket 28. As shown, each clamp has two jaws 49, 50, which may be clamped against and disengaged from the arm 30 by turning a disk 51, 52, each disk having a pair of cam slots 53, 54, in which pins 55, 56 of the slidable jaws 49 and 50 are engaged. Obviously other types of clamps may be employed, if desired. The magazine may be charged by loosening the rear clamp 48 and threading a quantity of ties on arm 30, then tightening clamp 48 and loosening clamp 47 to allow the ties to pass to the tie delivery mechanism, and then tightening clamp 47. If desired, a further supply of ties may be placed on arm 30 between the clamps 47 and 48. Preferably, when the machine operates, both clamps are tight, to secure the most rigid positioning of the magazine. The double and spaced clamping arrangement permits replenishment of the ties without interrupting the sealing of successive bottles by the machine.

As the yoke 12 lowers during the operation of the machine, the head casting and magazine also lower, by gravity. The head 59 of plunger 32 strikes the top of a properly positioned bottle to be sealed, thus stopping further movement of the plunger, and actuates the magazine finger 43 inwardly to deliver a tie. The other parts of the head continue to descend with yoke 12 until the set screw 27 on the head assembly meets the top of plunger 32, and from this point the yoke 12 lowers without any other part of the head assembly following this further movement. The bushings 23, 24 reduce the friction of this movement. The tie which has been released from the finger 43 on the previous stroke was resting on fingers 60, which are pivoted on the head, and on the downward movement of the head the heels 61 of these fingers 60 have engaged the top of the bottle and have retracted the fingers to cause the tie to drop therefrom around the neck of the bottle, and upon the hook 62 of the twisting spindle 63, for tensioning and twisting. The heels 61 are pivoted on the fingers 60 so that they will have no tendency to cling to the lip of the bottle when they are moved upwardly over this lip and away from the bottle. (See Fig. 6).

The twisting spindle 63 is slidably and rotatably mounted on the head casting. It is moved forward and back (see Fig. 12) by means of a cam 70 on shaft 7, cooperating with a cam roller 71 on a lever 72, which is secured to a shaft 73, on which is also an arm 74. The other end of arm 74 is connected by a link 75 to a crank 76 secured to a vertical shaft 77. At the top of shaft 77 (see Fig. 5) is pinned a crank 78, which has a pin 79 engaging in a slot 80 in a collar 81 which is mounted loosely on the twisting spindle 63 and confined between two collars 82 secured on the spindle. A spring 83, secured to the frame of the machine and to a heel portion 84 of the arm 72, keeps the cam roller against the cam 70 to follow the undulations of the cam surface. The spindle is retracted as the higher surfaces of the cam engage the cam roller 71, and the spindle advances as this roller rides over the lower surfaces.

On the head casting, which is carried by the yoke 12, are pivoted, on a pin 90, two side arms 91 of a U-shaped member, of which the bridge or cross portion 92 coacts with an article to be tied to keep the article in proper position during this operation. This member 92 also functions as an anvil on which the wire tie rests for being nicked after it has been twisted, as will be described more fully hereinafter. This anvil member not only moves vertically with the head casting, but also swings on the pivot pin 90 toward and from the article on which the machine operates. The mechanism for effecting this pivotal movement of the anvil includes (see Fig. 13) a cam 93 keyed to the main driving shaft 7 and continuously engaging a cam roller 94 carried on an arm 95 secured to shaft 73, to which is also attached another arm 97 which, at its upper end, is connected by a link 98 to a crank arm 99 secured to the lower end of a hollow vertical shaft 100. Slidable in shaft 100 is another hollow shaft 101, which, however, is connected to shaft 100 for rotation therewith by means of splines 102. On the top of hollow shaft 101 (see Fig. 4) is a sector gear 103, which is in continuous mesh with a rack 104 slidably mounted in a groove 105 on the head casting. To the front end of rack 104 is secured an adjustable link 106, and the other end of this link is connected to one arm 107 of a lever, which is pivoted intermediate its ends on a pin 108 carried on the side walls of the head casting. The other end 109 of this lever constitutes the tool for placing a nick in a twisted tie, and to this end it is provided with a point or edge 110 (see Fig 7). As shown in Fig. 13, there is a spring 111 having one end secured to the frame of the machine, and the other end secured to a heel 112 on lever 95, to keep the cam roller 94 continuously against the cam 93. As the roller 94 rides on the higher cam surfaces, sector gear 103 causes the slide 104 to move forwardly, which, in turn, through link 106, pivots the nicking lever and causes its end 107 to pivot the anvil 92 forwardly. A spring 113 (see Fig. 15) engaging the head casting and one arm 91 of the anvil member urges the anvil 92 to move rearwardly when slide 104 is retracted by reverse movement of sector gear 103. Retracting movement of slide 104 obviously causes the nicking element 110 to approach the anvil 92, and when a nick is to be made in a twisted wire, it is desired that the anvil 92 be held in extreme forward position while the nicker is brought down forcibly on a wire lying on this anvil to place a nick in the wire adjacent its twisted portion. To maintain this anvil in its forward position while the nicker is actuated by the retraction of slide 104, there is provided (see Figs. 7 and 17) a wedge or finger 115 which has a reduced threaded end 116 penetrating a perforation in the yoke 25 and supported thereon by means of a nut 117, which rests on a spring 118 confined between this nut and the top of the yoke 25. The lower end 119 of this member 115 is adapted to coact with a heeled portion 120 on one of the anvil walls 91 to drive the anvil into furthest forward position and to maintain it in such position irrespective of the retraction of the rack 104, until this wedge is released from the anvil. The synchronized operation of this wedge will be described hereinafter.

The tie engaging head of the twisting spindle may be of the form shown in Figs. 18, 19 and 20. It may comprise a base 125, at the outer edge of which is a vertical portion 126, which is offset to one side of the axis of rotation of the spindle. On one side the bottom of this portion 126 projects to form a shoulder 127, and at the other side the top of portion 126 projects to form a shoulder 128. The design of this head is such that when the spindle rotates in the direction of the arrow shown in Fig. 18, it will engage a tie on its shoulders 127 and 128 and cause the tie to be twisted, and then when the spindle is rotated in the reverse direction, the head will rotate itself out of engagement with the tie, by reason of the offset disposition of the head with respect to the axis of the spindle and the absence of portions of the head which will engage the tie during this motion.

The rotation of the spindle, first in one direction and then in the other, is accomplished by means of a cam 130 (Fig. 11) which is secured to main driving shaft 7 and has a cam track 131, in which rides a roller 132 of an arm 133, which is secured to a shaft 134. An angular lever 135 is secured at one end to shaft 134, and at the other end to a sector gear 136, which has bevel gear teeth 137 in constant mesh with a bevel gear 138, which is splined to a shaft 139 and through which shaft 139 may slide while maintaining the rotative connection. At the top of shaft 139 (Fig. 4) is secured a bevel gear 140, which is in constant mesh with a bevel gear 141, which has a hub 142 within which the spindle 63 is engaged, by means of splines 143, for slidable movement therein and for rotation therewith. The cam track 131 is so shaped that the spindle will have the desired rotation at proper times, both in twisting direction and in tie releasing direction.

The operation of the machine is as follows:—In its normal intermediate position, which the machine automatically assumes after the completion of the tying of each successive article, the various actuating mechanisms are in the positions shown in Figs. 11, 12, 13 and 14. The parts of the machine above the table top 4 will be in the positions shown in Figs. 1 and 3, and the tie magazine mechanism will be in the position best seen in Fig. 8. From these views, it will be noted that the yoke 12 is in its uppermost position, and has raised the article embracing circular portion 123 of the head casting and all the parts mounted on the head casting, to-wit, the anvil 92, the nicker 110, the spindle 63, and the various mechanisms connecting these elements with their actuating mechanisms, well above the height of an article, such as 5, to be tied or sealed by the machine. The magazine for the ties has also been raised above the height of such article, and, therefore, there is no obstruction which can interfere with the placement of an article 5 in proper position to be tied by the machine.

An article, such as a milk bottle 5, to which has been loosely applied an ordinary paper cap 5′ of the type which has an apron, is now placed in proper position, either manually or by suitable automatic conveyors, as desired. Power is now applied to the pulley 9 of the machine to drive the main driving shaft 7. This causes the actuation of the various mechanisms hereinbefore described and causes the following movements. The yoke 12 lowers, carrying with it all the various parts which are mounted thereon, as above described, until the plunger 32 of the tie delivery mechanism has been caused, by reason of its engagement with the top of the article 5, to be engaged by the set screw 27 on the bracket 26. This engagement between the article and the plunger 32 and the head casting bracket 26 will prevent the head casting and the parts mounted thereon from lowering further, but will permit a further lowering of the two yokes 12 and 25, which are secured to the rods 10 and 11, and the arrangement is such that the mechanism (Fig. 14) which governs the movement of these rods will cause this final relative movement between the yokes 12 and 25 and the head casting and the parts carried thereby. The intermediate positions of the various parts of the machine during this downward movement of the head casting and the yokes 12 and 25 are illustrated in Figs. 15, 16 and 17, which also illustrate the manner in which a tie is delivered upon the article and is tied and nicked. In the initial condition of the machine, there is a tie resting about the cylindrical portion 31 of the tie delivery means and on a plurality of the pivoted fingers 60. As the head casting moves down, the heels of these fingers strike the top of the milk bottle and are moved from under the tie. Meanwhile, the twisting spindle has been moved forwardly so that its hook is close to the article, and the tie, when so released from the fingers 60, will fall behind the hook of the spindle and about the apron of the hood on the article. As the head casting lowers, the plunger 32 will engage the top of the milk bottle and cause relative movement of the magazine with respect to this plunger. This relative movement will actuate the tie feeding mechanism to release a tie from the finger 44 and to place the finger 43 in the path thereof. When the lowering of the head casting and the parts carried thereon has been stopped by the engagement of the plunger 32 with the set screw 27, the spindle is retracted to tension tie about the bottle, and simultaneously the anvil 92 has been moved forwardly to compress the hood against the bottle and to prevent the tensioning of the tie from drawing the bottle toward the machine. Meanwhile, the lowering of the yokes 12 and 25 with respect to the head casting has caused the wedge finger 115 to drive the anvil forwardly, for the purpose just stated, and to maintain the anvil in this position until the tie has been twisted and nicked. After the tie has been tensioned by the retraction of the spindle, the spindle is simultaneously rotated to twist the tie, and during the first turn, the spindle is advanced to compensate for the shortening of the tie due to the formation of this first twist. The wire tie thus twisted lies on the anvil 92, and the nicking knife or edge 110 is now brought down with a sharp blow upon the wire adjacent the twist to weaken the wire, by placing a nick therein. Quickly the nicking element is withdrawn, and the spindle is rotated in a reverse direction to disengage its hook from the tie. At about this time, the upward movement of the yokes 12 and 25 toward engagement with the head casting causes the wedge member 115 to snap out of engagement with the anvil 92, and the anvil, spindle and nicker are all retracted, so that there will be no interference with the article or the tied seal thereon, as further movement of the yoke 12 meets the head casting and carries this casting and the parts mounted thereon upwardly and out of the way of the tied article. As the magazine is moved away from the article, a spring 200, compressed between the head of the plunger 32 and the magazine casting, causes the plunger 32 to lower, and this causes the feed of another tie to the fingers 60 in position for delivery to the next article to be sealed.

To allow the tie engaging fingers 60 to move upwardly away from the bottle without any chance of catching into the hood or tie, I provide these finger portions with heels 61. Each heel 61 is located in a recess 191 on the finger, and is held forwardly thereon by means of a spring 192. Thus, when the fingers are lowered over the bottle, the heel portions 61 engage the top of the bottle, and by their coaction with the walls of the slots in which the heels are located cause the fingers to free the tie. When the fingers are raised away from the bottle, the springs 192 allow the heel portions 61 to pass freely over the contacted portions. This is most clearly seen in Fig. 6.

From the above it will be apparent that the machine may be driven continuously, and that whenever a bottle comes into position to be sealed the machine will automatically seal it by placing and twisting a wire ring tie about its neck. The machine also forms a finger loop in the tie and weakens the tie at the twist, so that the tie will break when an attempt is made to untwist it. No tie is delivered when there is no bottle in place to be tied.

When access to the contents of the bottle is desired, the finger loop portion of the tie provides convenient means for twisting the tie to cause it to break at its weakened point, whereupon the tie becomes removed from the bottle and the bottle is unsealed. The weakening of the tie at the twist frustrates any attempt to gain access to the contents of the bottle without removing the twisted tie therefrom, and thus when the intended consumer receives the bottle with the seal intact, it is certain that the contents of the bottle have not been tampered with by an unauthorized person. A great saving to the bottler results from the fact that the tie must be physically removed from the bottle when it is opened, because if the tie or seal remains on the bottle when empty, the bottler, if he refills the bottle, must pay for having the rings or seals removed, and many bottles are broken by this operation.

The machine is capable of quick operation and can tie or seal a large number of bottles in a very short time. It is compact and durable and not easily disordered.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In an apparatus of the character described, means for applying a seal to an article, said means including a confining collar and a coacting anvil pivoted with respect to the collar, said collar and anvil being movable into position embracing the article to confine it, and being movable away from the article to free it from said embrace and confinement.

2. In an apparatus of the character described, means for applying a seal to an article, said means including a confining collar and a coacting anvil pivoted with respect to the collar, said collar and anvil being movable into position embracing the article to confine it, and being movable away from the article to free it from said embrace and confinement, said anvil being movable away from the collar to permit said collar and anvil to be movable freely over the article, and being movable toward the collar to confine the article closely therebetween.

3. In an apparatus of the character described, in combination, means for applying a tie to an article, said means including a confining collar and a coacting anvil pivoted with respect to the collar, said collar and anvil being movable into position embracing the article to confine it, and being movable away from the article to free it from said embrace and confinement, a twisting spindle, mechanism, tripped as said collar and anvil move into position confining the article, for placing a tie about the article and in engagement with the spindle, and mechanism for rotating said spindle to twist the tie about the article while confined by said collar and anvil.

4. In an apparatus of the character described, in combination, means for applying a wire tie to an article, said means including a confining collar and a coacting anvil pivoted with respect to the collar, said collar and anvil being movable into position embracing the article to confine it, and being movable away from the article to free it from said embrace and confinement, a twisting spindle, mechanism, tripped as said collar and anvil move into position confining the article, for placing a tie about the article and in engagement with the spindle, mechanism for rotating said spindle to twist the tie about the article while confined by said collar and anvil, and a movable head which raises and lowers with respect to the article to be sealed, said collar, anvil and twisting spindle being carried on and movable with the movable head.

5. In an apparatus of the character described, in combination, a twisting spindle, mechanism for advancing the spindle into position to receive a tie, for then retracting the spindle to tension the tie about an article for twisting, for then advancing the spindle to compensate for the shortening of the tie due to twisting, and for then retracting the spindle to free the article for removal without obstruction by the spindle, means for rotating the spindle in one direction to twist the tie, and means for releasing the twisted tie from the spindle.

6. In an apparatus of the character described, in combination, a twisting spindle, mechanism for advancing the spindle into position to receive a tie, for then retracting the spindle to tension the tie about an article for twisting, for then advancing the spindle to compensate for the shortening of the tie due to twisting, and for then retracting the spindle to free the article for removal without obstruction by the spindle, means for rotating the spindle in one direction to twist the tie, means for releasing the twisted tie from the spindle, and means for placing a nick in the tie adjacent the twist.

7. In an apparatus of the character described, in combination, a twisting spindle, mechanism for advancing the spindle into position to receive a tie, for then retracting the spindle to tension the tie about an article for twisting, for then advancing the spindle to compensate for the shortening of the tie due to twisting, and for then retracting the spindle to free the article for removal without obstruction by the spindle, means for rotating the spindle in one direction to twist the tie, means for releasing the twisted tie from the spindle, and means for confining the article during the tensioning and twisting of the tie, and then releasing the article from the confinement.

8. In an apparatus of the character described, in combination, a twisting spindle, mechanism for advancing the spindle into position to receive a tie, for then retracting the spindle to tension the tie about an article for twisting, for then advancing the spindle to compensate for the shortening of the tie due to twisting, and for then retracting the spindle to free the article for removal without obstruction by the spindle, means for rotating the spindle in one direction to twist the tie, means for releasing the twisted tie from the spindle, means for placing a nick in the tie adjacent the twist, and means for confining the article during the tensioning, twisting and nicking of the tie, and then releasing the article from the confinement.

9. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding the ties for final delivery.

10. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding ties for final delivery, said feed mechanism including a pair of reversely operating fingers in the line of movement of the ties and movable alternately into and out of the path of movement of the ties along said arm.

11. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding the ties for final delivery, said stop means including pivoted fingers having portions movable into and out of the path of a tie fed from the magazine.

12. In an apparatus of the character described, in combination, a magazine for ring ties including an arm on which ties may be threaded, feed mechanism on said magazine for feeding ties singly and successively from the magazine, releasable stop means in the path of ties delivered from the magazine for holding the ties for final delivery, the feed mechanism including an actuating member adapted to coact with an article to be sealed by one of said ties, to effect the delivery of a tie to said stop means.

13. In an apparatus of the character described, in combination, a magazine for ring ties including an arm on which ties may be threaded, feed mechanism on said magazine for feeding ties singly and successively from the magazine, releasable stop means in the path of ties delivered from the magazine for holding the ties for final delivery, and said stop means being adapted to coact with an article to be sealed to release a tie from the stop means for engagement with the article.

14. In an apparatus of the character described, in combination, a magazine for ring ties including an arm on which ties may be threaded, feed mechanism on said magazine for feeding ties singly and successively from the magazine, releasable stop means in the path of ties delivered from the magazine for holding the ties for final delivery, the feed mechanism being adapted to coact with an article to be sealed, to effect the delivery of a tie to said stop means, and said stop means being adapted to coact with the article to be sealed to release a tie from the stop means for engagement with the article.

15. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding ties for final delivery, said magazine and feed mechanism being movable bodily relatively to an article positioned to be sealed, and said feed mechanism being adapted to engage said article whereby said mechanism is actuated to feed a tie from the magazine.

16. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding ties for final delivery, said magazine and stop means being movable bodily relatively to an article positioned to be sealed, and said stop means being adapted to engage the article, whereby said means is actuated to deliver to the article a tie held by said means.

17. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding ties for final delivery, said magazine and said feed means and said stop means being bodily movable relatively to an article positioned to be sealed, said feed means and said stop means being adapted to engage the article, whereby the stop means is actuated to deliver to the article a tie held thereby and said feed means is actuated to deliver a tie from the magazine to the stop means.

18. In an apparatus of the character described, in combination, a magazine for ring ties including an arm on which ties may be threaded, feed mechanism on said magazine for feeding ties singly and successively from the magazine, and releasable stop means in the path of ties delivered from the magazine for holding ties for final delivery, a support for the magazine and two adjustable clamps on the support for securing the magazine thereto, said clamps embracing said magazine and separately disengageable therefrom to permit ties to pass by either one of said clamps while the magazine is held in place by the other clamp.

19. In combination, a magazine for ring ties for sealing articles, and mechanism for feeding ring ties from the magazine, said mechanism including a member movable with respect to an article positioned to be sealed and into contact therewith, whereby the feed mechanism is actuated to deliver a ring tie from the magazine.

20. In an apparatus of the character described, in combination, a magazine for ring ties, means for feeding ties singly and successively from said magazine, said means, including two members, one movable with respect to the other, to actuate said feeding means to deliver a tie, both of said members being movable with respect to articles to be tied and one being engaged by an article, whereby said members are caused to have relative movement whereby a tie is fed from said magazine onto said article.

21. In a machine of the character described, in combination, an article embracing collar, a pivoted anvil movable toward the collar, mechanism for moving said anvil a certain distance toward said collar, and a wedge for moving said anvil a further distance toward said collar.

22. In a machine of the character described, in combination, an article embracing collar, a pivoted anvil movable toward the collar, mechanism for moving said anvil a certain distance toward said collar, a wedge for moving said anvil a further distance toward said collar, and spring means for moving and holding said anvil away from said collar when disengaged from said mechanism and wedge.

23. In a machine of the character described, in combination, an article embracing collar, a pivoted anvil movable toward the collar, mechanism for moving said anvil a certain distance toward said collar, a wedge for moving said anvil a further distance toward said collar, and means, including a movable yoke, for moving said wedge into and out of engagement with said anvil.

24. In a machine of the character described, in combination, an article embracing collar, a pivoted anvil movable toward the collar, mechanism for moving said anvil a certain distance toward said collar, a wedge for moving said anvil a further distance toward said collar, and means, including a movable yoke, for moving said wedge into and out of engagement with said anvil, said wedge being slidably movable on said yoke, and spring means resisting said movement, whereby the disengagement of said wedge from said anvil due to movement of said yoke is delayed.

25. A tie twisting mandrel of the character described having at its end a hook portion extending at an angle to the axis of the mandrel and offset to one side of said axis, a tie engaging shoulder extending sidewise from the bottom of said portion at one side, and another shoulder extending sidewise from the top of said portion at the other side.

26. In a machine of the character described, in combination, means for twisting a ring tie to tighten the same upon the skirt of a hood cap applied to the top of a bottle, to fasten the cap on the bottle, means for nicking the tie after being twisted, so that further twisting of the tie causes fracture thereof, and means for actuating both of said means repeatedly in synchronized sequence.

27. In combination, a magazine for ring ties for sealing articles, and mechanism adapted to be actuated by an article positioned to be sealed for feeding ring ties from the magazine, said mechanism including a movable member adapted to come into contact with and to be stopped by the article.

28. In combination, a magazine for ring ties for sealing articles, and mechanism for feeding ring ties from the magazine, said mechanism including two movable members, one of said members being adapted to come into contact with and to be stopped by an article positioned to be sealed, and means for moving the other member relatively to the stopped member.

This specification signed this 12th day of March, 1926.

HENRY B. FOULDER.